(12) United States Patent
Zhao

(10) Patent No.: US 11,963,208 B2
(45) Date of Patent: Apr. 16, 2024

(54) RESOURCE ALLOCATION METHOD AND APPARATUS

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 422 days.

(21) Appl. No.: 17/420,788

(22) PCT Filed: Jan. 9, 2019

(86) PCT No.: PCT/CN2019/071023
§ 371 (c)(1),
(2) Date: Jul. 6, 2021

(87) PCT Pub. No.: WO2020/142940
PCT Pub. Date: Jul. 16, 2020

(65) Prior Publication Data
US 2022/0116950 A1    Apr. 14, 2022

(51) Int. Cl.
*H04W 72/53* (2023.01)
*H04W 72/0446* (2023.01)
(Continued)

(52) U.S. Cl.
CPC ....... *H04W 72/53* (2023.01); *H04W 72/0446* (2013.01); *H04W 72/0453* (2013.01); *H04W 72/23* (2023.01); *H04W 72/542* (2023.01)

(58) Field of Classification Search
CPC ............. H04W 72/53; H04W 72/0446; H04W 72/0453; H04W 72/23; H04W 72/542
See application file for complete search history.

(56) References Cited

U.S. PATENT DOCUMENTS

2018/0091265 A1    3/2018   Liu et al.
2018/0351723 A1*  12/2018   Feng ................... H04W 56/001

FOREIGN PATENT DOCUMENTS

CN    104185281 A    12/2014
CN    106612561 A     5/2017
(Continued)

OTHER PUBLICATIONS

CMCC, "Discussion on HARQ feedback and CSI acquisition for sidelink", 3GPP TSG RAN WG1 Meeting #95 R1-1812879, Spokane, USA, Nov. 12-16, 2018.
(Continued)

*Primary Examiner* — Mohammad S Anwar
(74) *Attorney, Agent, or Firm* — Syncoda LLC; Feng Ma

(57) ABSTRACT

A resource allocation method includes: receiving resource allocation indication information sent by a base station, or acquiring pre-configured resource allocation indication information, wherein the resource allocation indication information is used for characterizing time domain resources occupied by a forward time-frequency resource and/or time domain resources occupied by a reverse time-frequency resource for direct communication in a target time unit, and the forward time-frequency resource is used for transmitting user data and control information, and the reverse time-frequency resource is used for transmitting feedback information from a user data receiving device to a user data sending device; and determining, according to the resource allocation indication information, a time domain resource occupied by the forward time-frequency resource and/or a time domain resource occupied by the reverse time-frequency resource.

20 Claims, 17 Drawing Sheets

Resource allocation indication information is received from a base station, or pre-configured resource allocation indication information is acquired, wherein the resource allocation indication information characterizes at least one of: a time domain resource occupied by a forward time-frequency resource for sidelink communication in a target time unit, or a time domain resource occupied by a reverse time-frequency resource for sidelink communication in the target time unit, the forward time-frequency resource transmits user data and control information, and the reverse time-frequency resource transmits feedback information from a device for receiving the user data to a device for transmitting the user data — 201

At least one of: the time domain resource occupied by the forward time-frequency resource or the time domain resource occupied by the reverse time-frequency resource is determined according to the resource allocation indication information — 202

(51) Int. Cl.
*H04W 72/0453* (2023.01)
*H04W 72/23* (2023.01)
*H04W 72/542* (2023.01)

(56) References Cited

FOREIGN PATENT DOCUMENTS

| CN | 108923894 A | 11/2018 | | |
|---|---|---|---|---|
| WO | WO-2012079344 A1 | * | 6/2012 | ........... H04B 7/0413 |
| WO | WO-2017113182 A1 | * | 7/2017 | ............. H04L 45/26 |

OTHER PUBLICATIONS

Qualcomm Incorporated, "Considerations on Physical Layer aspects of NR V2X", 3GPP TSG RAN WG1 Meeting #94bis R1-1811261, Chengdu, China, Oct. 8-12, 2018.
LG Electronics, "Discussion on physical layer structure and procedures for NR sidelink", 3GPP TSG RAN WG1 Meeting #94bis R1-1810281, Chengdu, China, Oct. 8-12, 2018.
Supplementary European Search Report in the European application No. 19909382.4, dated Dec. 13, 2021.
International Search Report in the international application No. PCT/CN2019/071023, dated Oct. 22, 2019.
Written Opinion of the International Search Authority in the international application No. PCT/CN2019/071023, dated Oct. 22, 2019.
First Office Action of the Chinese application No. 201980000125.5, dated Mar. 12, 2021.
Second Office Action of the Chinese application No. 201980000125.5, dated Aug. 16, 2021.

\* cited by examiner

| Resource allocation indication information is received from a base station, or pre-configured resource allocation indication information is acquired, wherein the resource allocation indication information characterizes at least one of: a time domain resource occupied by a forward time-frequency resource for sidelink communication in a target time unit, or a time domain resource occupied by a reverse time-frequency resource for sidelink communication in the target time unit, the forward time-frequency resource transmits user data and control information, and the reverse time-frequency resource transmits feedback information from a device for receiving the user data to a device for transmitting the user data | 201 |

| At least one of: the time domain resource occupied by the forward time-frequency resource or the time domain resource occupied by the reverse time-frequency resource is determined according to the resource allocation indication information | 202 |

FIG. 2

| Sequence number | Numbers of time domain symbols in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| ...... | | | | | | | | | | | | | | |
| n | x | x | x | Sidelink Forward | Sidelink Forward | Sidelink Forward | Sidelink Forward | Sidelink Forward | Sidelink Forward | Sidelink Forward | x | Sidelink Reverse | Sidelink Reverse | x |
| ...... | | | | | | | | | | | | | | |

FIG. 4

RESOURCE ALLOCATION METHOD AND APPARATUS

CROSS-REFERENCE TO RELATED APPLICATION

The present application is a national stage of International Application No. PCT/CN2019/071023 filed on Jan. 9, 2019, the disclosure of which is hereby incorporated by reference in its entirety.

TECHNICAL FIELD

The disclosure relates to the technical field of communication, and in particular to a method and apparatus for resource allocation.

BACKGROUND

Vehicle to everything (V2x) refers to a new generation of information and communication technology connecting a vehicle to everything. V2x includes communications such as Vehicle to Vehicle (V2V), Vehicle to Pedestrian (V2P) and Vehicle to Infrastructure (V2I). A cellular based V2x (C-V2x) may fully utilize existing base station deployments, reduce device overheads and satisfy the requirements of V2x services. In the C-V2x, the communication between an onboard device and another device may be implemented by relays of the base station and a core network, i.e., using the existing communication link between a user equipment (UE) and the base station in the cellular network, or by sidelink (SL) communication directly through a sidelink between devices.

In order to support different service requirements of various V2x services while providing communication of higher rate, shorter delay and more reliable quality, a physical layer in $5^{th}$ Generation (5G) New Radio (NR)-based V2x (NR V2x) technology needs to support unicast transmission and multicast transmission, and a physical layer Hybrid Automatic Repeat Request (HARQ) feedback mechanism of the unicast transmission and the multicast transmission. NR V2x introduces a Physical Sidelink Feedback channel (PSFCH) for transmitting HARQ feedback information, to support the physical layer HARQ of the unicast and multicast in the sidelink communication. Then, it is necessary to solve the problem of how to configure PSFCH resources.

SUMMARY

Embodiments of the disclosure provide a method and apparatus for resource allocation. The technical solution includes the following aspects.

According to a first aspect of the embodiments of the disclosure, there is provided a method for resource allocation, the method is applied to a UE and includes the following operations.

Resource allocation indication information is received from a base station, or pre-configured resource allocation indication information is acquired. The resource allocation indication information indicates at least one of: a time domain resource occupied by a forward time-frequency resource for sidelink communication in a target time unit, or a time domain resource occupied by a reverse time-frequency resource for sidelink communication in the target time unit. The forward time-frequency resource transmits user data and control information, and the reverse time-frequency resource transmits feedback information from a device for receiving the user data to a device for transmitting the user data.

At least one of the time domain resource occupied by the forward time-frequency resource or the time domain resource occupied by the reverse time-frequency resource is determined according to the resource allocation indication information.

The technical solutions provided in the embodiments of the disclosure may have the following advantageous effects. In the technical solution, time-frequency resources for sidelink communication in a time unit are divided into a forward time-frequency resource and a reverse time-frequency resource to be multiplexed in a way of time division multiplexing. The forward time-frequency resource is used for transmitting user data and control information, and the reverse time-frequency resource is used for transmitting feedback information from a device for receiving the user data to a device for transmitting the user data. In such way, it is ensured that all the devices receiving on the forward time-frequency resource receive the user data and control information, and all the devices receiving on the reverse time-frequency resource receive the feedback information. Therefore, the problem of received power at different time symbols being inconsistent in a transmission process due to inconsistent switching times of the forward transmission and the reverse transmission of different users may be avoided, the receiving performance of the device is improved, and the service quality is enhanced.

In an embodiment, the resource allocation indication information may include at least one of: first resource indication information or second resource indication information.

The first resource indication information indicates a length of the time domain resource occupied by the forward time-frequency resource, and the second resource indication information indicates a length of the time domain resource occupied by the reverse time-frequency resource.

In an embodiment, the resource allocation indication information may include at least one of: third resource indication information or fourth resource indication information.

The third resource indication information indicates a starting position and a length of the time domain resource occupied by the forward time-frequency resource, and the fourth resource indication information indicates a starting position and a length of the time domain resource occupied by the reverse time-frequency resource.

In an embodiment, the resource allocation indication information may include an identifier of a time domain resource allocation format indicating the UE to determine, according to the time domain resource allocation format, at least one of: the time domain resource occupied by the forward time-frequency resource or the time domain resource occupied by the reverse time-frequency resource.

In an embodiment, the operation of receiving the resource allocation indication information from the base station may include the following actions.

A radio resource control (RRC) signaling is received from the base station, the RRC signaling includes the resource allocation indication information.

Or, downlink control information (DCI) is received from the base station, the DCI includes the resource allocation indication information.

In an embodiment, the method may further include the following operations.

A time domain resource between the forward time-frequency resource and the reverse time-frequency resource is determined as a guard interval. The time domain resource occupied by the guard interval provides the UE with a time for switching between transmission directions.

In an embodiment, the feedback information may include any one of: hybrid automatic repeat request (HARQ) feedback information or channel state information (CSI) feedback information, or a combination thereof.

According to a second aspect of the embodiments of the disclosure, there is provided a method for resource allocation, the method is applied to a base station and includes the following operations.

Time-frequency resources for sidelink communication in a target time unit are divided into a forward time-frequency resource and a reverse time-frequency resource for time division multiplexing. The forward time-frequency resource transmits user data and control information, and the reverse time-frequency resource transmits feedback information from a device for receiving the user data to a device for transmitting the user data.

Resource allocation indication information is transmitted to a UE. The resource allocation indication information indicates at least one of: a time domain resource occupied by the forward time-frequency resource or a time domain resource occupied by the reverse time-frequency resource.

In an embodiment, the resource allocation indication information may include at least one of: first resource indication information or second resource indication information.

The first resource indication information indicates a length of the time domain resource occupied by the forward time-frequency resource, and the second resource indication information indicates a length of the time domain resource occupied by the reverse time-frequency resource.

In an embodiment, the resource allocation indication information may include at least one of: third resource indication information or fourth resource indication information.

The third resource indication information indicates a starting position and a length of the time domain resource occupied by the forward time-frequency resource, and the fourth resource indication information indicates a starting position and a length of the time domain resource occupied by the reverse time-frequency resource.

In an embodiment, the resource allocation indication information may include an identifier of a time domain resource allocation format indicating the UE to determine, according to the time domain resource allocation format, at least one of: the time domain resource occupied by the forward time-frequency resource or the time domain resource occupied by the reverse time-frequency resource.

In an embodiment, the operation of transmitting the resource allocation indication information to the UE may include the following actions.

A radio resource control (RRC) signaling is transmitted to the UE. The RRC signaling includes the resource allocation indication information.

Or, downlink control information (DCI) is transmitted to the UE. The DCI includes the resource allocation indication information.

In an embodiment, the method may further include the following operations.

A time domain resource between the forward time-frequency resource and the reverse time-frequency resource is determined as a guard interval. The time domain resource occupied by the guard interval provides the UE with a time for switching between transmission directions.

In an embodiment, the feedback information may include any one of: hybrid automatic repeat request (HARD) feedback information or channel state information (CSI) feedback information, or a combination thereof.

According to a third aspect of the embodiments of the disclosure, there is provided an apparatus for resource allocation. The apparatus includes a receiving module and a first determination module.

The receiving module is configured to receive resource allocation indication information from a base station, or acquire pre-configured resource allocation indication information. The resource allocation indication information indicates at least one of: a time domain resource occupied by a forward time-frequency resource for sidelink communication in a target time unit, or a time domain resource occupied by a reverse time-frequency resource for sidelink communication in the target time unit. The forward time-frequency resource transmits user data and control information, and the reverse time-frequency resource transmits feedback information from a device for receiving the user data to a device for transmitting the user data.

The first determination module is configured to determine, according to the resource allocation indication information, at least one of: the time domain resource occupied by the forward time-frequency resource or the time domain resource occupied by the reverse time-frequency resource.

In an embodiment, the resource allocation indication information may include at least one of: first resource indication information or second resource indication information.

The first resource indication information indicates a length of the time domain resource occupied by the forward time-frequency resource, and the second resource indication information indicates a length of the time domain resource occupied by the reverse time-frequency resource.

In an embodiment, the resource allocation indication information may include at least one of: third resource indication information or fourth resource indication information.

The third resource indication information indicates a starting position and a length of the time domain resource occupied by the forward time-frequency resource, and the fourth resource indication information indicates a starting position and a length of the time domain resource occupied by the reverse time-frequency resource.

In an embodiment, the resource allocation indication information may include an identifier of a time domain resource allocation format indicating the UE to determine, according to the time domain resource allocation format, at least one of: the time domain resource occupied by the forward time-frequency resource or the time domain resource occupied by the reverse time-frequency resource.

In an embodiment, the receiving module may be configured to: receive a radio resource control (RRC) signaling from the base station, the RRC signaling includes the resource allocation indication information; or receive downlink control information (DCI) from the base station, the DCI includes the resource allocation indication information.

In an embodiment, the apparatus may further include a second determination module.

The second determination module is configured to determine a time domain resource between the forward time-frequency resource and the reverse time-frequency resource as a guard interval. The time domain resource occupied by the guard interval provides the UE with a time for switching between transmission directions.

In an embodiment, the feedback information may include any one of: hybrid automatic repeat request (HARD) feedback information or channel state information (CSI) feedback information, or a combination thereof.

According to a fourth aspect of the embodiments of the disclosure, there is provided an apparatus for resource allocation. The apparatus includes a division module and a transmission module.

The division module is configured to divide time-frequency resources for sidelink communication in a target time unit into a forward time-frequency resource and a reverse time-frequency resource for time division multiplexing. The forward time-frequency resource transmits user data and control information, and the reverse time-frequency resource transmits feedback information from a device for receiving the user data to a device for transmitting the user data.

The transmission module is configured to transmit resource allocation indication information to a UE. The resource allocation indication information indicates at least one of: a time domain resource occupied by the forward time-frequency resource or a time domain resource occupied by the reverse time-frequency resource.

In an embodiment, the resource allocation indication information may include at least one of: first resource indication information or second resource indication information.

The first resource indication information indicates a length of the time domain resource occupied by the forward time-frequency resource, and the second resource indication information indicates a length of the time domain resource occupied by the reverse time-frequency resource.

In an embodiment, the resource allocation indication information may include at least one of: third resource indication information or fourth resource indication information.

The third resource indication information indicates a starting position and a length of the time domain resource occupied by the forward time-frequency resource, and the fourth resource indication information indicates a starting position and a length of the time domain resource occupied by the reverse time-frequency resource.

In an embodiment, the resource allocation indication information may include an identifier of a time domain resource allocation format indicating the UE to determine, according to the time domain resource allocation format, at least one of: the time domain resource occupied by the forward time-frequency resource or the time domain resource occupied by the reverse time-frequency resource.

In an embodiment, the transmission module may be configured to: transmit a radio resource control (RRC) signaling to the UE, the RRC signaling includes the resource allocation indication information; or transmit downlink control information (DCI) to the UE, the DCI includes the resource allocation indication information.

In an embodiment, the apparatus may further include a third determination module.

The third determination module is configured to determine a time domain resource between the forward time-frequency resource and the reverse time-frequency resource as a guard interval. The time domain resource occupied by the guard interval provides the UE with a time for switching between transmission directions.

In an embodiment, the feedback information may include any one of: hybrid automatic repeat request (HARQ) feedback information or channel state information (CSI) feedback information, or a combination thereof.

According to a fifth aspect of the embodiments of the disclosure, there is provided an apparatus for resource allocation. The apparatus includes a processor and memory for storing instructions executable by the processor.

The processor is configured to perform the following operations.

Resource allocation indication information is received from a base station, or pre-configured resource allocation indication information is acquired. The resource allocation indication information indicates at least one of: a time domain resource occupied by a forward time-frequency resource for sidelink communication in a target time unit, or a time domain resource occupied by a reverse time-frequency resource for sidelink communication in the target time unit. The forward time-frequency resource transmits user data and control information, and the reverse time-frequency resource transmits feedback information from a device for receiving the user data to a device for transmitting the user data.

At least one of the time domain resource occupied by the forward time-frequency resource or the time domain resource occupied by the reverse time-frequency resource is determined according to the resource allocation indication information.

According to a sixth aspect of the embodiments of the disclosure, there is provided an apparatus for resource allocation. The apparatus includes a processor and memory for storing instructions executable by the processor.

The processor is configured to perform the following operations.

Time-frequency resources for sidelink communication in a target time unit are divided into a forward time-frequency resource and a reverse time-frequency resource for time division multiplexing. The forward time-frequency resource transmits user data and control information, and the reverse time-frequency resource transmits feedback information from a device for receiving the user data to a device for transmitting the user data.

Resource allocation indication information is transmitted to a UE. The resource allocation indication information indicates at least one of: a time domain resource occupied by the forward time-frequency resource or a time domain resource occupied by the reverse time-frequency resource.

According to a seventh aspect of the embodiments of the disclosure, there is provided a computer-readable storage medium having stored thereon at least one instruction. The instruction causes a processor to implement operations performed in the method according to the first aspect, when being loaded and executed by the processor.

According to an eighth aspect of the embodiments of the disclosure, there is provided a computer-readable storage medium having stored thereon at least one instruction. The instruction causes a processor to implement operations performed in the method according to the second aspect, when being loaded and executed by the processor.

It should be understood that the foregoing general descriptions and the following detailed descriptions are exemplary and explanatory only, and are not intended to limit the disclosure.

BRIEF DESCRIPTION OF THE DRAWINGS

The accompanying drawings, which are incorporated in and constitute a part of the description, illustrate embodi

FIG. 2 is a flowchart illustrating a method for resource allocation according to an exemplary embodiment.

FIG. 4 illustrates a schematic diagram of a resource division scheme corresponding to a time domain resource allocation format.

DETAILED DESCRIPTION

Figure 1:
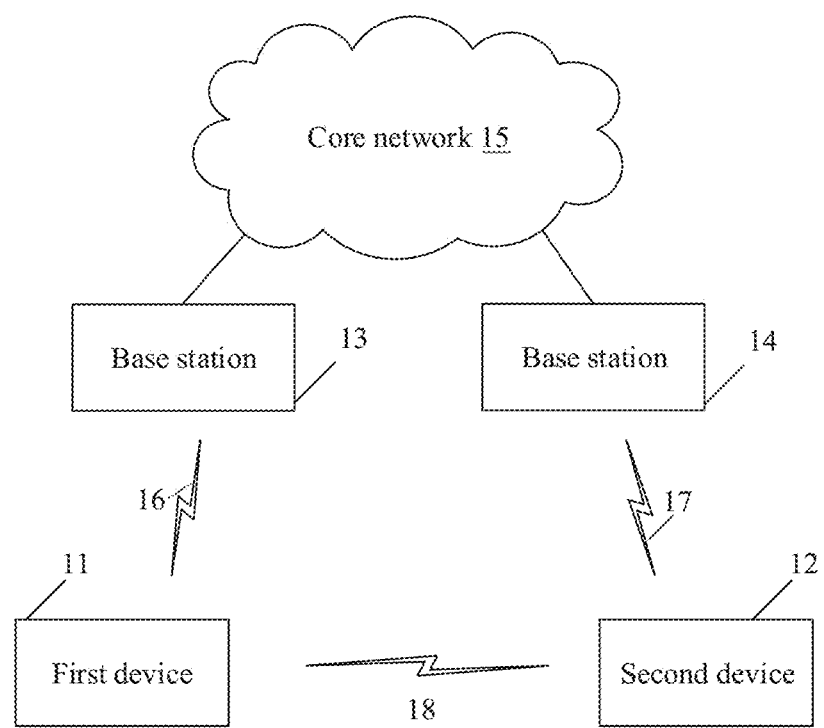
- FIG. 1 is a diagram illustrating an application scenario of a method for resource allocation according to an exemplary embodiment.

Reference will now be made in detail to exemplary embodiments, examples of which are illustrated in the accompanying drawings. The following description refers to the accompanying drawings in which the same number in different drawings represent the same or similar element, unless specifically stated otherwise. The implementations set forth in the following descriptions of exemplary embodiments do not represent all implementations consistent with the disclosure. Instead, they are merely examples of apparatuses and methods consistent with some aspects related to the disclosure as recited in the appended claims.

In the related art, in the C-V2x, a scheme of configuring a resource pool is used for allocating time-frequency resources to various sidelink channels, such as a Physical Sidelink Share Channel (PSSCH) and a Physical Sidelink Control Channel (PSCCH). For example, configuration information for the PSSCH and the PSCCH resource pools may include the following information: time domain positions of subframes occupied by the PSSCH and the PSCCH resource pools (the PSSCH and the PSCCH occupy the same time domain resource), frequency domain positions occupied by the PSSCH resource pool, and frequency domain positions occupied by the PSCCH resource pool.

However, 5G NR V2x introduces a PSFCH for transmitting HARQ feedback information, to support the physical layer HARQ of the unicast and multicast in the sidelink communication. Since the NR V2x needs to support services being more sensitive to delay, the PSFCH may occupy only a part of the Orthogonal Frequency Division Multiplexing (OFDM) symbols in a time unit for supporting a faster feedback. However, since the transmission and reception directions of the PSFCH are opposite to the transmission and reception directions of the PSSCH and the PSCCH respectively, and the UE may need to switch between transmission and reception in one time unit, thus a sufficient switching time is required to be left. In addition, since the UE for transmitting the PSFCH is different from the UE for transmitting the PSSCH and the PSCCH, other UEs has an inconsistent power received on different OFDM time domain symbols in the one time unit. Moreover, since a period of time may be required to adjust an operating point of an Automatic gain control (AGC) due to the influence of a linear range of the AGC, the receiving performance may be reduced even if other UEs use different frequency domain resources in the one time unit.

In order to solve this problem, an embodiment of the disclosure provides a method for resource allocation, the method is applied to a UE and includes the following operations. Resource allocation indication information is received from a base station, or pre-configured resource allocation indication information is acquired. The resource allocation indication information indicates at least one of: a time domain resource occupied by a forward time-frequency resource for sidelink communication in a target time unit, or a time domain resource occupied by a reverse time-frequency resource for sidelink communication in the target time unit. The forward time-frequency resource transmits user data and control information, and the reverse time-frequency resource transmits feedback information from a device for receiving the user data to a device for transmitting the user data. At least one of the time domain resource occupied by the forward time-frequency resource or the time domain resource occupied by the reverse time-frequency resource is determined according to the resource allocation indication information. According to the method for resource allocation provided in the embodiment of the disclosure, time-frequency resources for sidelink communication in a time unit are divided into a forward time-frequency resource and a reverse time-frequency resource to be multiplexed in a way of time division multiplexing (TDM). The forward time-frequency resource is used for transmitting user data and control information, and the reverse time-frequency resource is used for transmitting feedback information from a device for receiving the user data to a device for transmitting the user data. In such way, it is ensured that all the devices receiving on the forward time-frequency resource receive the user data and control information, and all the devices receiving on the reverse time-frequency resource receive the feedback information. Therefore, the problem of received power at different time symbols being inconsistent in a transmission process due to inconsistent switching times of the forward transmission and the reverse transmission of different users may be avoided, the receiving performance of the device is improved, and the service quality is enhanced.

FIG. 1 illustrates an alternative application scenario of a method for resource allocation according to an embodiment of the disclosure. The application scenario illustrated in FIG. 1 includes a first device 11, a second device 12, and a base station 13, a base station 14 and a core network 15 in a cellular network. The cellular network may be a 4th Generation (4G) or 5G network. The first device 11 communicates with the base station 13 through an air interface 16, and the second device 12 communicates with the base station 14 through an air interface 17. The communication between the first device 11 and the second device 12 may be implemented by relays of the base station 13, the base station 14 and the core network 15 or by sidelink communication directly through a sidelink 18 between the first device 11 and the second device 12. The application scenario illustrated in FIG. 1 is only an example of a possible application scenario of the technical solutions described in the embodiments of the disclosure. Other application scenarios may include devices and networks not involved in FIG. 1. In practice, the first device 11 and the second device 12 may also access to the same base station.

It is noted that the method for resource allocation provided in the embodiments of the disclosure may be applied to the V2x technology. The UE in the embodiments of the disclosure may include, for example, an onboard device, a handheld device and a roadside device that support V2x sidelink communication. The handheld device may include, for example, electronic devices such as a smartphone, a tablet computer, a desktop computer, a laptop, a drone, or a wearable device (such as a hand ring and smart glasses) etc.

The following specific embodiments are proposed based on the above analysis.

FIG. 2 is a flowchart illustrating a method for resource allocation according to an exemplary embodiment. An execution subject of the method for resource allocation in the embodiment of the disclosure may be a UE. As illustrated in FIG. 2, the method includes the following operations 201-202.

At operation 201, resource allocation indication information is received from a base station, or pre-configured resource allocation indication information is acquired. The resource allocation indication information indicates at least one of: a time domain resource occupied by a forward time-frequency resource for sidelink communication in a target time unit, or a time domain resource occupied by a reverse time-frequency resource for sidelink communication in the target time unit. The forward time-frequency resource transmits user data and control information, and the reverse time-frequency resource transmits feedback information from a device for receiving the user data to a device for transmitting the user data.

As an example, the feedback information may include any one of: HARQ feedback information or CSI feedback information, or a combination thereof.

As an example, the UE may receive the resource allocation indication information from the base station, or the UE may use the pre-configured resource allocation indication information. For example, the pre-configured resource allocation indication information may be stored in the UE, and the UE may use pre-configured system parameters and configuration information for communication when the UE is outside a coverage of the cellular network. Herein, the UE receiving the resource allocation indication information from the base station is taken as an example for illustration. When the base station is required for allocating time-frequency resources for sidelink channels such as the PSSCH, PSCCH and PSFCH etc. in the sidelink communication, the base station may divide time-frequency resources for sidelink communication in a target time unit into a forward time-frequency resource and a reverse time-frequency resource based on sizes of estimated time-frequency resources occupied by the user data, control information and feedback information respectively for the sidelink communication. The forward time-frequency resource and the reverse time-frequency resource are multiplexed in a way of time division multiplexing, the forward time-frequency resource is used for transmitting user data and control information, and the reverse time-frequency resource is used for transmitting feedback information (such as HARQ feedback information and CSI feedback information etc.) from a device for receiving the user data to a device for transmitting the user data. For example, the forward time-frequency resource may be allocated to the PSSCH and PSCCH for transmission of the user data by the PSSCH and transmission of the control information by the PSCCH, and the reverse time-frequency resource may be allocated to the PSFCH for transmission of the feedback information by the PSFCH. In an embodiment, the time domain resources occupied by the forward time-frequency resource in the target time unit are continuous, and the time domain resources occupied by the reverse time-frequency resource in the target time unit are also continuous.

As an example, the target time unit may include any one or combination of: a frame, a subframe, a slot, or a symbol. In the following, by way of example for illustration, the slot is taken as a time unit, and the symbol is taken as a minimum unit for the time domain resource division. However, the disclosure does not exclude other possibilities, for example, the subframe or the frame may be taken as the time unit, and the slot may be taken as the minimum unit for the time domain resource division.

As an example, an implementation of receiving the resource allocation indication information from the base station at operation 201 may include any one or combination of the following actions A and B.

Action A): an RRC signaling is received from the base station, the RRC signaling includes the resource allocation indication information. Generally, the RRC configures semi-static information or static information, and the information may be updated in units of minutes, hours or days.

Action B): DCI is received from the base station, the DCI includes the resource allocation indication information. Generally, DCI signaling is a dynamic signaling, and the information may be updated in units of milliseconds.

In an embodiment, whether the base station indicates the frequency domain resources occupied by the forward time-frequency resource and the reverse time-frequency resource to the UE or not, is not limited in the disclosure. The forward time-frequency resource and the reverse time-frequency resource may include all frequency domain resources as a default, and in an embodiment, a position of the lowest frequency domain resource and a width of the frequency domain resource may also be specified for the forward time-frequency resource and the reverse time-frequency resource.

As an example, an implementation of the resource allocation indication information may include any one or combination of the following cases a), b) or c).

Case a): the resource allocation indication information includes at least one of first resource indication information or second resource indication information. The first resource indication information indicates a length of the time domain resource occupied by the forward time-frequency resource for sidelink communication in the target time unit, and the second resource indication information indicates a length of the time domain resource occupied by the reverse time-frequency resource.

As an example, in the embodiment, by way of example for illustration, the time domain symbol is taken as the minimum unit for the time domain resource division, the target time unit is composed of several time domain symbols. When all time domain resources in the target time unit are used for sidelink communication, the base station may define that sequence number of the time domain symbol occupied by the forward time-frequency resource is smaller than sequence number of the time domain symbol occupied by the reverse time-frequency resource. In other words, the base station may define that the forward time-frequency resource occupies the time domain symbol at a front position in the target time unit, and the reverse time-frequency resource occupies the time domain symbol at a latter position in the target time unit. In addition, the resource allocation indication information transmitted from the base station to the UE includes at least one of the first resource indication information or the second resource indication information. The first resource indication information indicates the length of the time domain resource occupied by the forward time-frequency resource for sidelink communication in the target time unit, i.e., indicates the time domain symbol occupied by the forward time-frequency resource in the target time unit; and the second resource indication information indicates the length of the time domain resource occupied by the reverse time-frequency resource i.e., indicates the time domain symbol occupied by the reverse time-frequency resource in the target time unit. The time domain symbol(s) between the forward time-frequency resource and the reverse time-frequency resource in the target time unit may be used as a guard interval or for other purposes.

Case b): the resource allocation indication information includes at least one of third resource indication information or fourth resource indication information. The third resource indication information indicates a starting position and a length of the time domain resource occupied by the forward time-frequency resource for sidelink communication in the target time unit, and the fourth resource indication information indicates a starting position and a length of the time domain resource occupied by the reverse time-frequency resource.

As an example, when the target time unit includes both the time domain symbols used for sidelink communication and the time domain symbols only used for uplink and downlink communication between the base station and the UE, the resource allocation indication information transmitted from the base station to the UE may include at least one of the third resource indication information or the fourth resource indication information. The third resource indication information indicates the starting position and the length of the time domain resource occupied by the forward time-frequency resource for sidelink communication in the target time unit, i.e., indicates the starting position of the time domain resource and the number of the time domain symbols occupied by the forward time-frequency resource in the target time unit; and the fourth resource indication information indicates the starting position and the length of the time domain resource occupied by the reverse time-frequency resource, i.e., indicates the starting position of the time domain resource and the number of the time domain symbols occupied by the reverse time-frequency resource in the target time unit.

Case c): the resource allocation indication information includes an identifier of a time domain resource allocation format indicating the UE to determine, according to the time domain resource allocation format, at least one of the time domain resource occupied by the forward time-frequency resource or the time domain resource occupied by the reverse time-frequency resource.

As an example, multiple different time domain resource allocation formats may be pre-defined in a communication protocol, each of the time domain resource allocation formats corresponds to a resource division scheme which divides time-frequency resources for sidelink communication in a time unit into the forward time-frequency resource and the reverse time-frequency resource. In addition, an identifier, such as a sequence number, is allocated to each of the time domain resource allocation formats. The configuration information is written into a static or semi-static memory of the UE in advance, where the configuration information includes the identifier of each of the time domain resource allocation formats and correspondences between different time domain resource allocation formats and different resource division schemes.

The base station determines a resource division scheme for dividing the time-frequency resources for sidelink communication in the target time unit into the forward time-frequency resource and the reverse time-frequency resource, according to sizes of estimated physical resources occupied by the user data, control information and feedback information respectively for sidelink communication. Moreover, the base station obtains the time domain resource allocation format corresponding to the resource division scheme based on the configuration information. Then, the base station transmits the identifier of the time domain resource allocation format carried in downlink dynamic indication signaling (e.g., DCI), and the identifier of the time domain resource allocation format indicates the UE to use the resource division scheme corresponding to the time domain resource allocation format.

At operation 202, at least one of the time domain resource occupied by the forward time-frequency resource or the time domain resource occupied by the reverse time-frequency resource is determined according to the resource allocation indication information.

The UE determines at least one of the time domain resource occupied by the forward time-frequency resource or the time domain resource occupied by the reverse time-frequency resource according to the resource allocation indication information. Then, the user data and control information are transmitted on the forward time-frequency resource, and the feedback information from the device for receiving the user data to the device for transmitting the user data is transmitted on the reverse time-frequency resource.

As an example, a time domain resource between the forward time-frequency resource and the reverse time-frequency resource may be determined as a guard interval. The time domain resource occupied by the guard interval provides the UE with a time for switching between transmission directions, thus the UE is provided with the time for switching between transmission directions. Therefore, the problem of received power at different time symbols being inconsistent in a transmission process due to inconsistent switching times of the forward transmission and the reverse transmission of different users may be avoided.

According to the technical solution provided in the embodiment of the disclosure, time-frequency resources for sidelink communication in a time unit are divided into a forward time-frequency resource and a reverse time-frequency resource to be multiplexed in a way of time division multiplexing. The forward time-frequency resource is used for transmitting user data and control information, and the reverse time-frequency resource is used for transmitting feedback information from a device for receiving the user data to a device for transmitting the user data. In such way, it is ensured that all the devices receiving on the forward time-frequency resource receive the user data and control information, and all the devices receiving on the reverse time-frequency resource receive the feedback information. Therefore, the problem of received power at different time symbols being inconsistent in a transmission process due to inconsistent switching times of the forward transmission and the reverse transmission of different users may be avoided, the receiving performance of the device is improved, and the service quality is enhanced.

Figure 3:
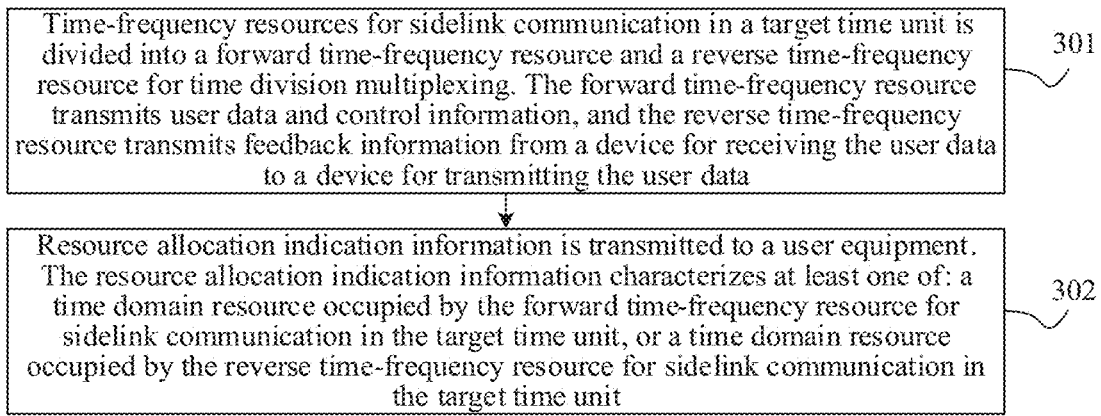
FIG. 3 is a flowchart illustrating a method for resource allocation according to an exemplary embodiment.

FIG. 3 is a flowchart illustrating a method for resource allocation according to an exemplary embodiment. An execution subject of the method for resource allocation in the embodiment of the disclosure may be a base station of a cellular network. As illustrated in FIG. 3, the method includes the following operations 301-302.

At operation 301, time-frequency resources for sidelink communication in a target time unit are divided into a forward time-frequency resource and a reverse time-frequency resource for time division multiplexing. The forward time-frequency resource transmits user data and control information, and the reverse time-frequency resource transmits feedback information from a device for receiving the user data to a device for transmitting the user data.

As an example, the target time unit may include any one or combination of: a frame, a subframe, a slot, or a time domain symbol. The feedback information may include any one of: HARQ feedback information or CSI feedback information, or a combination thereof.

As an example, when the base station is required for allocating time-frequency resources for sidelink channels such as the PSSCH, PSCCH and PSFCH etc. in the sidelink communication, the base station may divide time-frequency resources for sidelink communication in a target time unit into a forward time-frequency resource and a reverse time-frequency resource based on sizes of estimated physical resources occupied by the user data, control information and feedback information respectively for sidelink communication. The forward time-frequency resource and the reverse time-frequency resource are multiplexed in a way of time division multiplexing, the forward time-frequency resource is used for transmitting user data and control information, and the reverse time-frequency resource is used for transmitting feedback information (such as HARQ feedback information and CSI feedback information, etc.) from a device for receiving the user data to a device for transmitting the user data. For example, the time domain resource occupied by the forward time-frequency resource may be allocated to the PSSCH and PSCCH for transmission of the user data by the PSSCH and transmission of the control information by the PSCCH, and the time domain resource occupied by the reverse time-frequency resource may be allocated to the PSFCH for transmission of the feedback information by the PSFCH. In an embodiment, the time domain resources occupied by the forward time-frequency resource in the target time unit are continuous, and the time domain resources occupied by the reverse time-frequency resource in the target time unit are also continuous.

At operation 302, resource allocation indication information is transmitted to a UE. The resource allocation indication information indicates at least one of: a time domain resource occupied by the forward time-frequency resource for sidelink communication in a target time unit, or a time domain resource occupied by the reverse time-frequency resource for sidelink communication in the target time unit.

As an example, an implementation of transmitting the resource allocation indication information to the UE at operation 302 may include any one or combination of the following actions 1) or 2).

Action 1): a RRC signaling is transmitted to the UE. The RRC signaling includes the resource allocation indication information.

Action 2): DCI is transmitted to the UE. The DCI includes the resource allocation indication information.

After receiving the resource allocation indication information, the UE acquires, according to the resource allocation indication information, the time domain resource occupied by the forward time-frequency resource and the time domain resource occupied by the reverse time-frequency resource allocated by the base station. Then, the user data and control information are transmitted on the forward time-frequency resource, and the feedback information from the device for receiving the user data to the device for transmitting the user data is transmitted on the reverse time-frequency resource.

In an embodiment, whether the base station indicates the frequency domain resources occupied by the forward time-frequency resource and the reverse time-frequency resource to the UE or not, is not limited in the disclosure. The forward time-frequency resource and the reverse time-frequency resource may include all frequency domain resources as a default, and in an embodiment, a position of the lowest frequency domain resource and a width of the frequency domain resource may also be specified for the forward time-frequency resource and the reverse time-frequency resource.

As an example, an implementation of the resource allocation indication information may include any one or combination of the following cases a) or b).

Case a): the resource allocation indication information includes at least one of first resource indication information or second resource indication information. The first resource indication information indicates a length of the time domain resource occupied by the forward time-frequency resource for sidelink communication in the target time unit, and the second resource indication information indicates a length of the time domain resource occupied by the reverse time-frequency resource As an example, in the embodiment, by way of example for illustration, the time domain symbol is taken as the minimum unit for the time domain resource division to indicate the time domain resource, the target time unit is composed of several time domain symbols. When all time domain resources in the target time unit are used for sidelink communication, the base station may define that sequence number of the time domain symbol occupied by the forward time-frequency resource is smaller than sequence number of the time domain symbol occupied by the reverse time-frequency resource. In other words, the base station may define that the forward time-frequency resource occupies the time domain symbol at a front position in the target time unit, and the reverse time-frequency resource occupies the time domain symbol at a latter position in the target time unit. In addition, the resource allocation indication information transmitted from the base station to the UE includes at least one of the first resource indication information or the second resource indication information. The first resource indication information indicates the length of the time domain resource occupied by the forward time-frequency resource for sidelink communication in the target time unit, i.e., indicates the time domain symbol occupied by the forward time-frequency resource in the target time unit; and the second resource indication information indicates the length of the time domain resource occupied by the reverse time-frequency resource i.e., indicates the time domain symbol occupied by the reverse time-frequency resource in the target time unit. The time domain symbol(s) between the forward time-frequency resource and the reverse time-frequency resource in the target time unit may be used as a guard interval or for other purposes.

Case b): the resource allocation indication information includes at least one of third resource indication information or fourth resource indication information. The third resource indication information indicates a starting position and a length of the time domain resource occupied by the forward time-frequency resource for sidelink communication in the target time unit, and the fourth resource indication information indicates a starting position and a length of the time domain resource occupied by the reverse time-frequency resource.

As an example, when the target time unit includes both the time domain symbols used for sidelink communication and the time domain symbols only used for uplink and downlink communication between the base station and the UE, the resource allocation indication information transmitted from the base station to the UE may include at least one of the third resource indication information or the fourth resource indication information. The third resource indication information indicates the starting position and the length of the time domain resource occupied by the forward time-frequency resource for sidelink communication in the target time unit, i.e., indicates the starting position of the time domain resource and the number of the time domain symbols occupied by the forward time-frequency resource in the target time unit; and the fourth resource indication information indicates the starting position and the length of the time domain resource occupied by the reverse time-frequency resource, i.e., indicates the starting position of the time domain resource and the number of the time domain symbols occupied by the reverse time-frequency resource in the target time unit.

Case c): the resource allocation indication information includes an identifier of a time domain resource allocation format indicating the UE to determine, according to the time domain resource allocation format, at least one of the time domain resource occupied by the forward time-frequency resource or the time domain resource occupied by the reverse time-frequency resource.

As an example, multiple different time domain resource allocation formats may be pre-defined in a communication protocol, each of the time domain resource allocation formats corresponds to a resource division scheme which divides time-frequency resources for sidelink communication in a time unit into the forward time-frequency resource and the reverse time-frequency resource. In addition, an identifier, such as a sequence number, is allocated to each of the time domain resource allocation formats. The configuration information is written into a static or semi-static memory of the UE in advance, where the configuration information includes the identifier of each of the time domain resource allocation formats and correspondences between different time domain resource allocation formats and different resource division schemes.

FIG. 4 illustrates a resource division scheme corresponding to a time domain resource allocation format. The resource division scheme corresponding to the time domain resource allocation format with sequence number n in FIG. 4 is described as followings. Time domain symbols 3 to 9 occupied by the forward time-frequency resource in the time unit transmit the user data and control information from a device for transmitting data to a device for receiving data. Time domain symbols 11 and 12 occupied by the reverse time-frequency resource in the time unit transmit the feedback information from a device for receiving data to a device for transmitting data. Herein, x represents a time domain symbol that may not be used for sidelink communication, and the time domain symbol x may be used for uplink and downlink communication, a guard interval, or other purposes.

The base station determines a resource division scheme for dividing the time-frequency resources for sidelink communication in the target time unit into the forward time-frequency resource and the reverse time-frequency resource, according to sizes of estimated physical resources occupied by the user data, control information and feedback information respectively for sidelink communication. Moreover, the base station obtains the time domain resource allocation format corresponding to the resource division scheme based on the configuration information. Then, the base station transmits the identifier of the time domain resource allocation format carried in downlink dynamic indication signaling (e.g., DCI), and the identifier of the time domain resource allocation format indicates the UE to use the resource division scheme corresponding to the time domain resource allocation format.

According to the technical solution provided in the embodiment of the disclosure, time-frequency resources for sidelink communication in a time unit are divided into a forward time-frequency resource and a reverse time-frequency resource to be multiplexed in a way of time division multiplexing. The forward time-frequency resource is used for transmitting user data and control information, and the reverse time-frequency resource is used for transmitting feedback information from a device for receiving the user data to a device for transmitting the user data. In such way, it is ensured that all the devices receiving on the forward time-frequency resource receive the user data and control information, and all the devices receiving on the reverse time-frequency resource receive the feedback information. Therefore, the problem of received power at different time symbols being inconsistent in a transmission process due to inconsistent switching times of the forward transmission and the reverse transmission of different users may be avoided, the receiving performance of the device is improved, and the service quality is enhanced.

Figure 5:
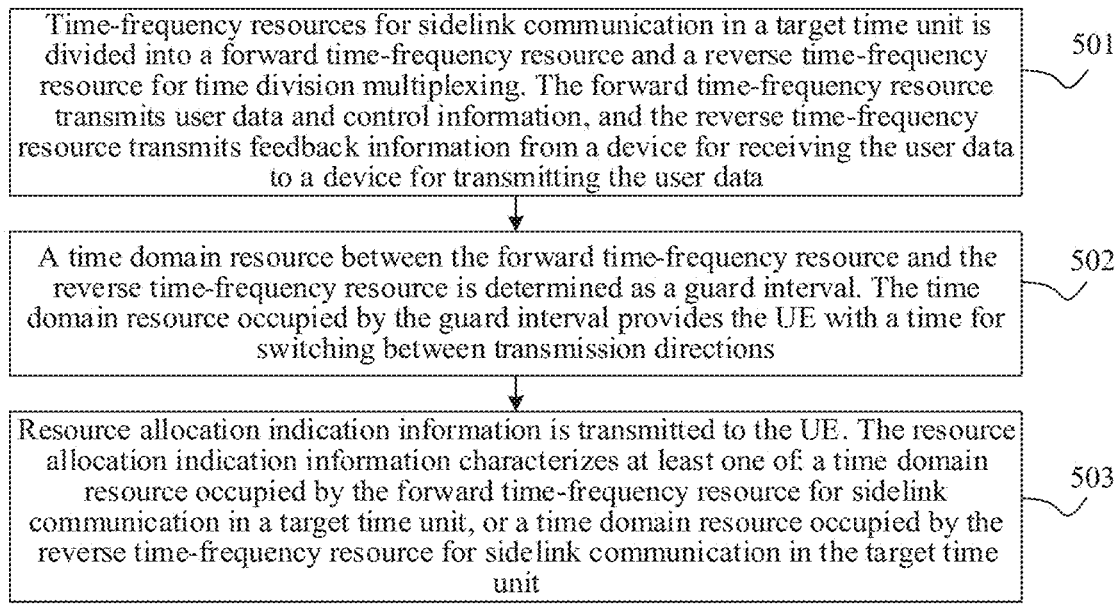
FIG. 5 is a flowchart illustrating a method for resource allocation according to an exemplary embodiment.

FIG. 5 is a flowchart illustrating a method for resource allocation according to an exemplary embodiment. An execution subject of the method for resource allocation in the embodiment of the disclosure may be a base station. As illustrated in FIG. 5, the method includes the following operations 501-503. Parts which are not described in detail in the embodiment may refer to the related description of the embodiment of FIG. 3.

At operation 501, time-frequency resources for sidelink communication in a target time unit are divided into a forward time-frequency resource and a reverse time-frequency resource for time division multiplexing. The forward time-frequency resource transmits user data and control information, and the reverse time-frequency resource transmits feedback information from a device for receiving the user data to a device for transmitting the user data.

At operation 502, a time domain resource between the forward time-frequency resource and the reverse time-frequency resource is determined as a guard interval. The time domain resource occupied by the guard interval provides the UE with a time for switching between transmission directions.

As an example, when there is no time domain resource for uplink and/or downlink communication between the forward time-frequency resource and the reverse time-frequency resource, a time domain guard interval is set between the forward time-frequency resource and the reverse time-frequency resource. The guard interval provides a time for switching between transmission directions, i.e., the time for switching between the receiving direction and the transmitting direction. When the time-frequency resource occupied by the forward time-frequency resource and the time-frequency resource occupied by the reverse time-frequency resource are not continuous in the time domain, the time-frequency resource between the forward time-frequency resource and the reverse time-frequency resource may be used as the guard interval, while may also be used for uplink and/or downlink communication. It is noted that the guard interval occupies neither the forward time-frequency resource nor the reverse time-frequency resource, but occupies the time domain symbol(s) between the forward time-frequency resource and the reverse time-frequency resource in the target time unit. In an embodiment, the behavior of the UE in the guard interval may not be defined. The guard interval may be configured by the base station to the UE, or configuration information of the guard interval may be written into a static or semi-static memory of the UE in advance.

Figure 6A:
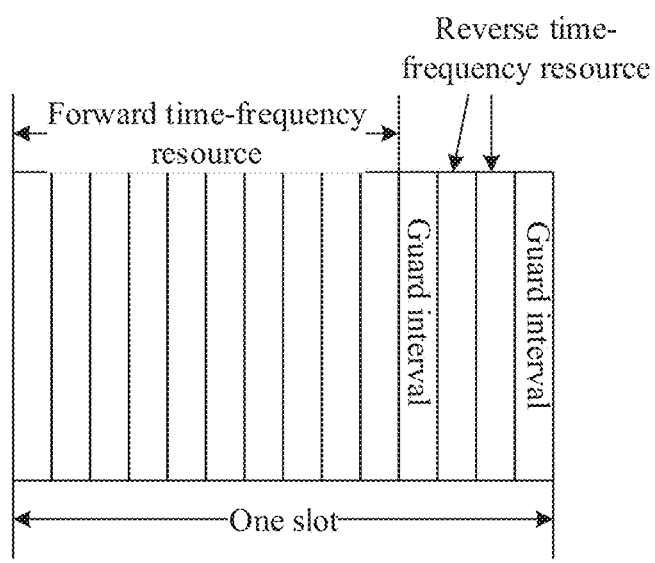
FIG. 6A illustrates a schematic diagram of a time domain resource allocation scheme.
Figure 6B:
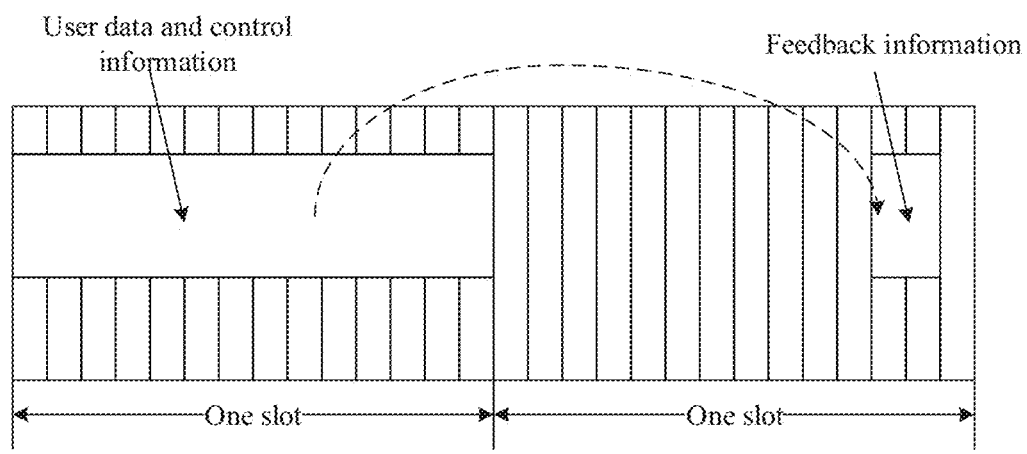
FIG. 6B illustrates a schematic principle diagram of information transmission based on the time domain resource allocation scheme illustrated in FIG. 6A.

FIG. 6A and FIG. 6B illustrate a resource allocation scheme. In FIG. 6A and FIG. 6B, the forward time-frequency resource occupies the first ten time domain symbols in a slot, the reverse time-frequency resource occupies the twelfth and thirteenth time domain symbols in the slot, and the guard interval occupies the eleventh and fourteenth time domain symbols in the slot. The time domain resource occupied by the forward time-frequency resource transmits the user data and control information from a device for transmitting data to a device for receiving data, the time domain resource occupied by the reverse time-frequency resource transmits the feedback information from a device for receiving data to a device for transmitting data, and the time domain resource occupied by the guard interval provides the UE with a time for switching between transmission directions.

Figure 6C:
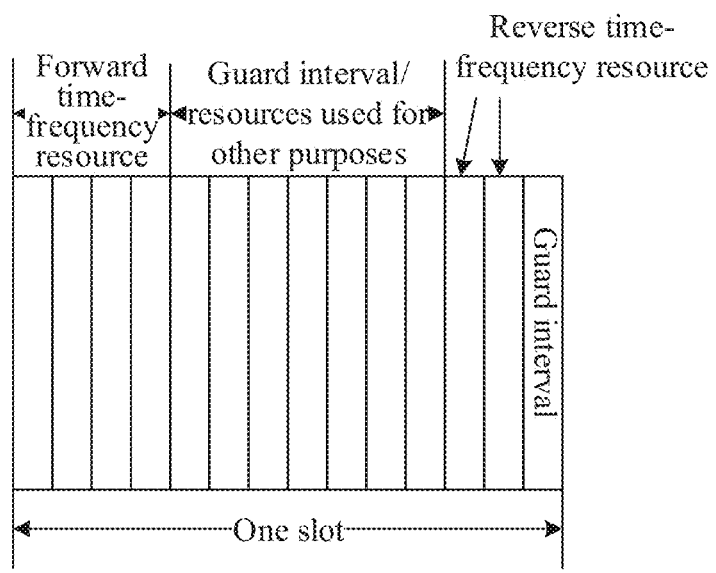
FIG. 6C illustrates a schematic diagram of a time domain resource allocation scheme.
Figure 6D:
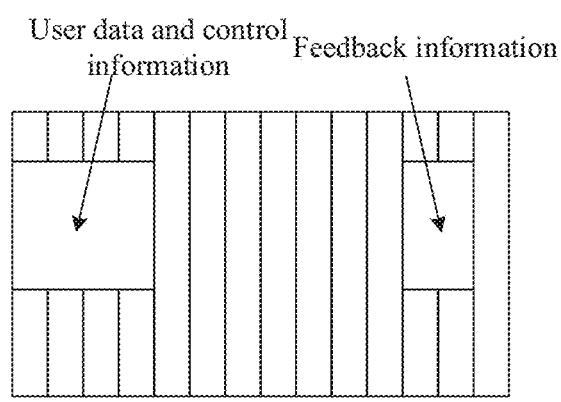
FIG. 6D illustrates a schematic principle diagram of information transmission based on the time domain resource allocation scheme illustrated in FIG. 6C.

FIG. 6C and FIG. 6D illustrate another resource allocation scheme. In FIG. 6C and FIG. 6D, the forward time-frequency resource occupies the first four time domain symbols in a slot, the reverse time-frequency resource occupies the twelfth and thirteenth time domain symbols in the slot. The time domain symbols between the forward time-frequency resource and the reverse time-frequency resource are determined as a resource for other purposes, a guard interval is included in the resource for other purposes. In addition, the fourteenth time domain symbol is also used as the guard interval.

At operation 503, resource allocation indication information is transmitted to a UE. The resource allocation indication information indicates at least one of: a time domain resource occupied by the forward time-frequency resource for sidelink communication in a target time unit, or a time domain resource occupied by the reverse time-frequency resource for sidelink communication in the target time unit.

According to the technical solution provided in the embodiment of the disclosure, time-frequency resources for sidelink communication in a time unit are divided into a forward time-frequency resource and a reverse time-frequency resource to be multiplexed in a way of time division multiplexing. In addition, a guard interval is allocated between the forward time-frequency resource and the reverse time-frequency resource to provide the UE with a time for switching between transmission directions. Therefore, the problem of received power at different time symbols being inconsistent in a transmission process due to inconsistent switching times of the forward transmission and the reverse transmission of different users may be avoided, the receiving performance of the device is improved, and the service quality is enhanced.

The following describes embodiments of the apparatus in the disclosure, which may implement the embodiments of the methods in the disclosure. Parts which are not described in detail in the embodiments of the apparatus may refer to the related descriptions of the embodiments of methods.

Figure 7:
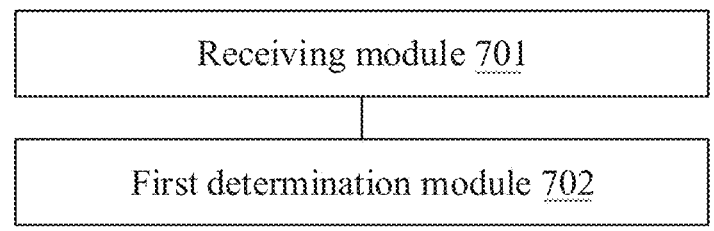
FIG. 7 is a block diagram illustrating an apparatus for resource allocation according to an exemplary embodiment.

FIG. 7 is a block diagram illustrating an apparatus for resource allocation according to an exemplary embodiment. The apparatus may be applied to a UE. As illustrated in FIG. 7, the apparatus for resource allocation includes a receiving module 701 and a first determination module 702.

The receiving module 701 is configured to receive resource allocation indication information from a base station, or acquire pre-configured resource allocation indication information. The resource allocation indication information indicates at least one of: a time domain resource occupied by a forward time-frequency resource for sidelink communication in a target time unit, or a time domain resource occupied by a reverse time-frequency resource for sidelink communication in the target time unit. The forward time-frequency resource transmits user data and control information, and the reverse time-frequency resource transmits feedback information from a device for receiving the user data to a device for transmitting the user data.

The first determination module 702 is configured to determine, according to the resource allocation indication information, at least one of: the time domain resource occupied by the forward time-frequency resource or the time domain resource occupied by the reverse time-frequency resource.

According to the technical solution provided in the embodiment of the disclosure, time-frequency resources for sidelink communication in a time unit are divided into a forward time-frequency resource and a reverse time-frequency resource to be multiplexed in a way of time division multiplexing. The forward time-frequency resource is used for transmitting user data and control information, and the reverse time-frequency resource is used for transmitting feedback information from a device for receiving the user data to a device for transmitting the user data. In such way, it is ensured that all the devices receiving on the forward time-frequency resource receive the user data and control information, and all the devices receiving on the reverse time-frequency resource receive the feedback information. Therefore, the problem of received power at different time symbols being inconsistent in a transmission process due to inconsistent switching times of the forward transmission and the reverse transmission of different users may be avoided, the receiving performance of the device is improved, and the service quality is enhanced.

In an embodiment, the resource allocation indication information may include at least one of: first resource indication information or second resource indication information.

The first resource indication information indicates a length of the time domain resource occupied by the forward time-frequency resource for sidelink communication in the target time unit, and the second resource indication information indicates a length of the time domain resource occupied by the reverse time-frequency resource.

In an embodiment, the resource allocation indication information may include at least one of: third resource indication information or fourth resource indication information.

The third resource indication information indicates a starting position and a length of the time domain resource occupied by the forward time-frequency resource for sidelink communication in the target time unit, and the fourth resource indication information indicates a starting position and a length of the time domain resource occupied by the reverse time-frequency resource.

In an embodiment, the resource allocation indication information may include an identifier of a time domain resource allocation format indicating the UE to determine, according to the time domain resource allocation format, at least one of: the time domain resource occupied by the forward time-frequency resource or the time domain resource occupied by the reverse time-frequency resource.

In an embodiment, the receiving module 701 may be configured to: receive a RRC signaling from the base station, the RRC signaling includes the resource allocation indication information; or receive DCI from the base station, the DCI includes the resource allocation indication information.

Figure 8:
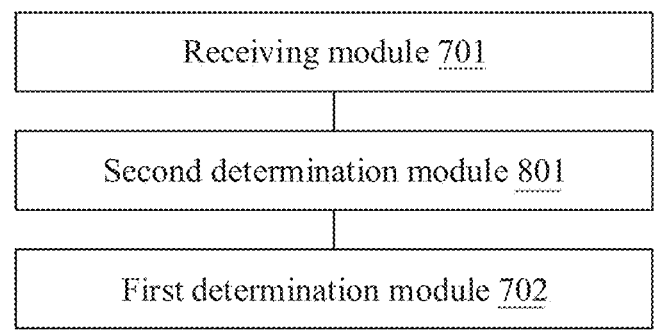
FIG. 8 is a block diagram illustrating an apparatus for resource allocation according to an exemplary embodiment.

In an embodiment, as illustrated in FIG. 8, the apparatus for resource allocation illustrated in FIG. 7 may further include a second determination module 801.

The second determination module 801 is configured to determine a time domain resource between the forward time-frequency resource and the reverse time-frequency resource as a guard interval. The time domain resource occupied by the guard interval provides the UE with a time for switching between transmission directions.

In an embodiment, the feedback information may include any one of: HARQ feedback information or CSI feedback information, or a combination thereof.

Figure 9:
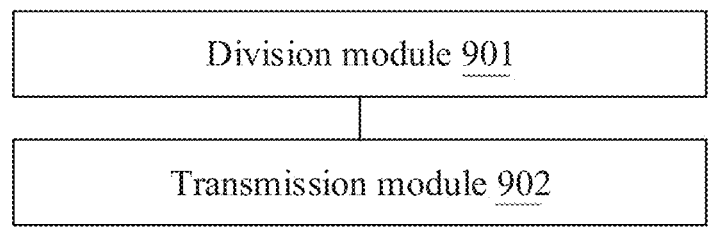
FIG. 9 is a block diagram illustrating an apparatus for resource allocation according to an exemplary embodiment.

FIG. 9 is a block diagram illustrating an apparatus for resource allocation according to an exemplary embodiment. The apparatus may be applied to a base station. As illustrated in FIG. 9, the apparatus for resource allocation includes a division module 901 and a transmission module 902.

The division module 901 is configured to divide time-frequency resources for sidelink communication in a target time unit into a forward time-frequency resource and a reverse time-frequency resource for time division multiplexing. The forward time-frequency resource transmits user data and control information, and the reverse time-frequency resource transmits feedback information from a device for receiving the user data to a device for transmitting the user data.

The transmission module 902 is configured to transmit resource allocation indication information to a UE. The resource allocation indication information indicates at least one of: a time domain resource occupied by the forward time-frequency resource for sidelink communication in the target time unit, or a time domain resource occupied by the reverse time-frequency resource for sidelink communication in the target time unit.

According to the technical solution provided in the embodiment of the disclosure, time-frequency resources for sidelink communication in a time unit are divided into a forward time-frequency resource and a reverse time-frequency resource to be multiplexed in a way of time division multiplexing. The forward time-frequency resource is used for transmitting user data and control information, and the reverse time-frequency resource is used for transmitting feedback information from a device for receiving the user data to a device for transmitting the user data. In such way, it is ensured that all the devices receiving on the forward time-frequency resource receive the user data and control information, and all the devices receiving on the reverse time-frequency resource receive the feedback information. Therefore, the problem of received power at different time symbols being inconsistent in a transmission process due to inconsistent switching times of the forward transmission and the reverse transmission of different users may be avoided, the receiving performance of the device is improved, and the service quality is enhanced.

In an embodiment, the resource allocation indication information may include at least one of: first resource indication information or second resource indication information.

The first resource indication information indicates a length of the time domain resource occupied by the forward time-frequency resource for sidelink communication in the target time unit, and the second resource indication information indicates a length of the time domain resource occupied by the reverse time-frequency resource.

In an embodiment, the resource allocation indication information may include at least one of: third resource indication information or fourth resource indication information.

The third resource indication information indicates a starting position and a length of the time domain resource occupied by the forward time-frequency resource for sidelink communication in the target time unit, and the fourth resource indication information indicates a starting position and a length of the time domain resource occupied by the reverse time-frequency resource.

In an embodiment, the resource allocation indication information may include an identifier of a time domain resource allocation format indicating the UE to determine, according to the time domain resource allocation format, at least one of: the time domain resource occupied by the forward time-frequency resource or the time domain resource occupied by the reverse time-frequency resource.

In an embodiment, the transmission module 902 may be configured to: transmit a RRC signaling to the UE, the RRC signaling includes the resource allocation indication information; or transmit DCI to the UE, the DCI includes the resource allocation indication information.

Figure 10:
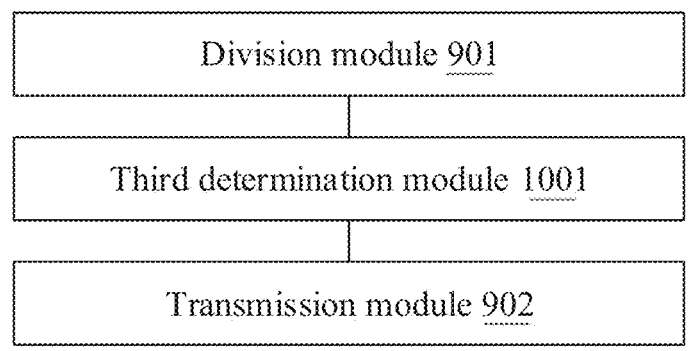
FIG. 10 is a block diagram illustrating an apparatus for resource allocation according to an exemplary embodiment.

In an embodiment, as illustrated in FIG. 10, the apparatus for resource allocation illustrated in FIG. 9 may further include a third determination module 1001. The third determination module 1001 is configured to determine a time domain resource between the forward time-frequency resource and the reverse time-frequency resource as a guard interval. The time domain resource occupied by the guard interval provides the UE with a time for switching between transmission directions.

In an embodiment, the feedback information may include any one of: HARQ feedback information or CSI feedback information, or a combination thereof.

Figure 11:
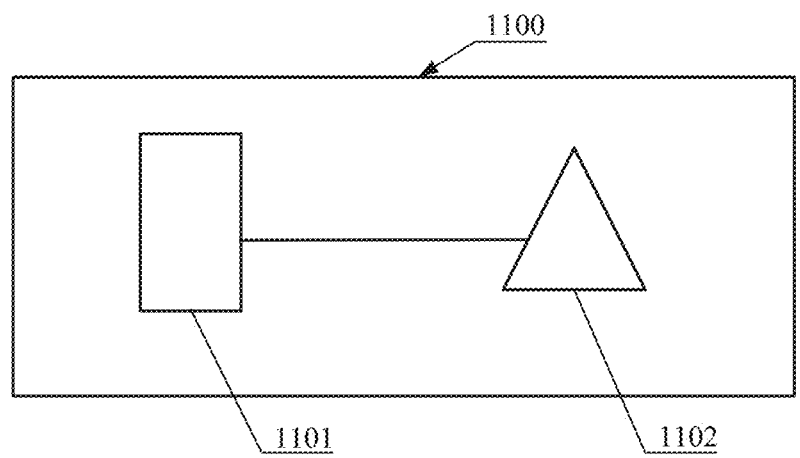
FIG. 11 is a block diagram illustrating an apparatus for resource allocation according to an exemplary embodiment.

FIG. 11 is a block diagram illustrating an apparatus 1100 for resource allocation according to an exemplary embodiment. The apparatus is applied to a UE. The resource allocation apparatus 1100 includes a processor 1101 and memory 1102 for storing instructions executable by the processor.

The processor 1101 is configured to perform the following operations.

Resource allocation indication information is received from a base station, or pre-configured resource allocation indication information is acquired. The resource allocation indication information indicates at least one of: a time domain resource occupied by a forward time-frequency resource for sidelink communication in a target time unit, or a time domain resource occupied by a reverse time-frequency resource for sidelink communication in the target time unit, the forward time-frequency resource transmits user data and control information, and the reverse time-frequency resource transmits feedback information from a device for receiving the user data to a device for transmitting the user data.

At least one of the time domain resource occupied by the forward time-frequency resource or the time domain resource occupied by the reverse time-frequency resource is determined according to the resource allocation indication information.

In an embodiment, the resource allocation indication information may include at least one of: first resource indication information or second resource indication information.

The first resource indication information indicates a length of the time domain resource occupied by the forward time-frequency resource for sidelink communication in the target time unit, and the second resource indication information indicates a length of the time domain resource occupied by the reverse time-frequency resource.

In an embodiment, the resource allocation indication information may include at least one of: third resource indication information or fourth resource indication information.

The third resource indication information indicates a starting position and a length of the time domain resource occupied by the forward time-frequency resource for sidelink communication in the target time unit, and the fourth resource indication information indicates a starting position and a length of the time domain resource occupied by the reverse time-frequency resource.

In an embodiment, the resource allocation indication information may include an identifier of a time domain resource allocation format indicating the UE to determine, according to the time domain resource allocation format, at least one of: the time domain resource occupied by the forward time-frequency resource or the time domain resource occupied by the reverse time-frequency resource.

In an embodiment, the processor 1101 may be further configured to perform the following operations.

A RRC signaling is received from the base station, the RRC signaling includes the resource allocation indication information.

Or, DCI is received from the base station, the DCI includes the resource allocation indication information.

In an embodiment, the processor 1101 may be further configured to perform the following operations.

A time domain resource between the forward time-frequency resource and the reverse time-frequency resource is determined as a guard interval. The time domain resource occupied by the guard interval provides the UE with a time for switching between transmission directions.

In an embodiment, the feedback information may include any one of: HARQ feedback information or CSI feedback information, or a combination thereof.

Figure 12:
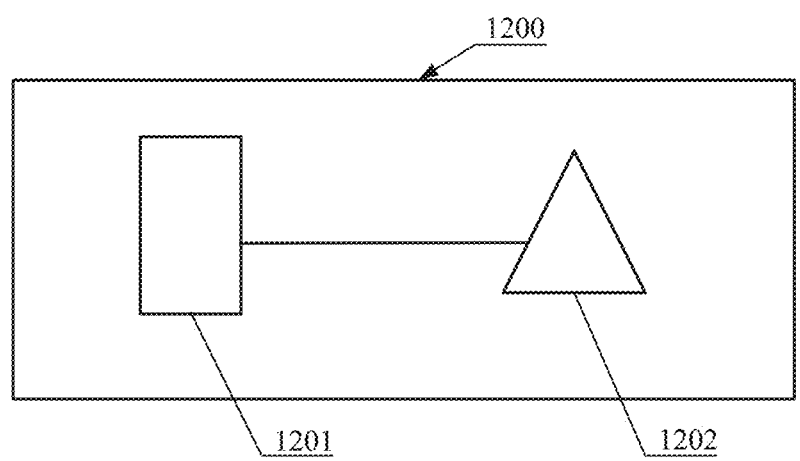
FIG. 12 is a block diagram illustrating an apparatus for resource allocation according to an exemplary embodiment.

FIG. 12 is a block diagram illustrating an apparatus 1200 for resource allocation according to an exemplary embodiment. The apparatus is applied to a base station. The apparatus 1200 for resource allocation includes a processor 1201 and memory 1202 for storing instructions executable by the processor.

The processor 1201 is configured to perform the following operations.

Time-frequency resources for sidelink communication in a target time unit are divided into a forward time-frequency resource and a reverse time-frequency resource for time division multiplexing. The forward time-frequency resource transmits user data and control information, and the reverse time-frequency resource transmits feedback information from a device for receiving the user data to a device for transmitting the user data.

Resource allocation indication information is transmitted to a UE. The resource allocation indication information indicates at least one of: a time domain resource occupied by the forward time-frequency resource for sidelink communication in a target time unit, or a time domain resource occupied by the reverse time-frequency resource for sidelink communication in the target time unit.

In an embodiment, the resource allocation indication information may include at least one of: first resource indication information or second resource indication information. The first resource indication information indicates a length of the time domain resource occupied by the forward time-frequency resource for sidelink communication in the target time unit, and the second resource indication information indicates a length of the time domain resource occupied by the reverse time-frequency resource.

In an embodiment, the resource allocation indication information may include at least one of: third resource indication information or fourth resource indication information. The third resource indication information indicates a starting position and a length of the time domain resource occupied by the forward time-frequency resource for sidelink communication in the target time unit, and the fourth resource indication information indicates a starting position and a length of the time domain resource occupied by the reverse time-frequency resource.

In an embodiment, the resource allocation indication information may include an identifier of a time domain resource allocation format indicating the UE to determine, according to the time domain resource allocation format, at least one of: the time domain resource occupied by the forward time-frequency resource or the time domain resource occupied by the reverse time-frequency resource.

In an embodiment, the processor 1201 may be further configured to perform the following operations.

A RRC signaling is transmitted to the UE. The RRC signaling includes the resource allocation indication information. Or, DCI is transmitted to the UE. The DCI includes the resource allocation indication information.

In an embodiment, the processor 1201 may be further configured to perform the following operations. A time domain resource between the forward time-frequency resource and the reverse time-frequency resource is determined as a guard interval. The time domain resource occupied by the guard interval provides the UE with a time for switching between transmission directions.

In an embodiment, the feedback information may include any one of: HARQ feedback information or CSI feedback information, or a combination thereof.

The specific manner in which various modules in the apparatus in the above-mentioned embodiments perform operations has been described in detail in the embodiments related to the methods, and will not be elaborated herein.

Figure 13:
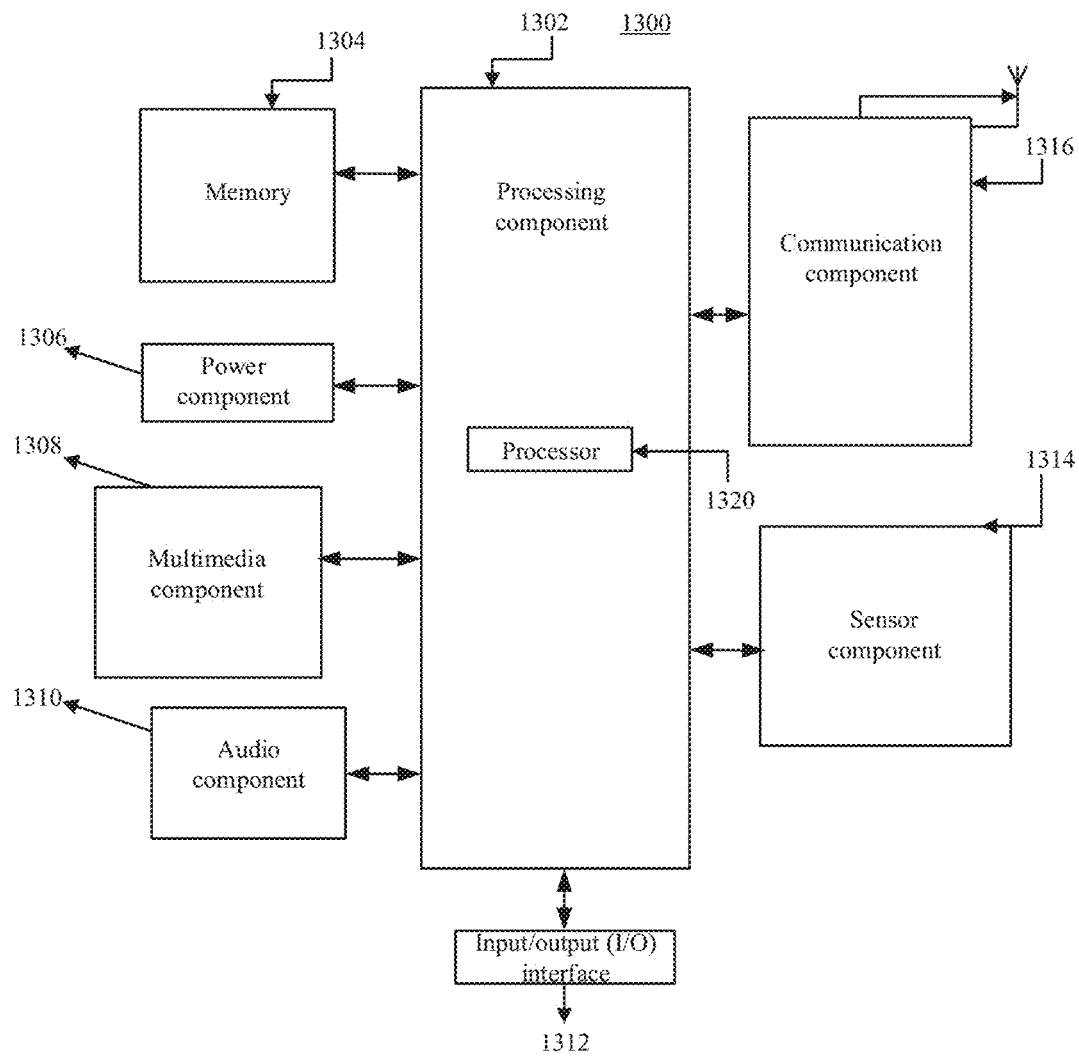
FIG. 13 is a block diagram illustrating an apparatus for resource allocation according to an exemplary embodiment.

FIG. 13 is a block diagram illustrating an apparatus for resource allocation according to an exemplary embodiment. The apparatus 1300 for resource allocation is adapted to a UE supporting sidelink communication of V2x. The apparatus 1300 for resource allocation may include one or more of the following components: a processing component 1302, memory 1304, a power component 1306, a multimedia component 1308, an audio component 1310, an input/output (I/O) interface 1312, a sensor component 1314, and a communication component 1316.

The processing component 1302 typically controls overall operations of the apparatus 1300 for resource allocation, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the apparatus 1300 for resource allocation. Examples of such data include instructions for any applications or methods operated on the apparatus 1300 for resource allocation, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the apparatus 1300 for resource allocation. The power component 1306 may include a power management system, one or more power sources, and any other components associated with the generation, management and distribution of power in the apparatus 1300 for resource allocation.

The multimedia component 1308 includes a screen providing an output interface between the apparatus 1300 for resource allocation and the user. In some embodiments, the screen may include a liquid crystal display (LCD) and a touch panel (TP). When the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the apparatus 1300 for resource allocation is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the apparatus 1300 for resource allocation is in an operation mode, such as a call mode, a recording mode and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the apparatus 1300 for resource allocation. For instance, the sensor component 1314 may detect an open/closed status of the apparatus 1300 for resource allocation, relative positioning of components, e.g., the display and the keypad, of the apparatus 1300 for resource allocation, a change in position of the apparatus 1300 for resource allocation or a component of the apparatus 1300 for resource allocation, a presence or absence of user contact with the apparatus 1300 for resource allocation, an orientation or an acceleration/deceleration of the apparatus 1300 for resource allocation, and a change in temperature of the apparatus 1300 for resource allocation. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the apparatus 1300 for resource allocation and other devices. The apparatus 1300 for resource allocation can access a wireless network based on a communication standard, such as Wi-Fi, 2G, or 3G, or a combination thereof. In an exemplary embodiment, the communication component 1316 receives a broadcast signal or broadcast associated information from an external broadcast management system via a broadcast channel. In an exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1300 for resource allocation may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1304, executable by the processor 1320 in the apparatus 1300 for resource allocation, for performing the above-described methods. For example, the non-transitory computer-readable storage medium may be a ROM, a RAM, a CD-ROM, a magnetic tape, a floppy disc, an optical data storage device, and the like.

The instructions stored in the storage medium cause the apparatus 1300 for resource allocation to implement the following method, when being executed by the processor. The method includes the following operations.

Resource allocation indication information is received from a base station, or pre-configured resource allocation indication information is acquired. The resource allocation indication information indicates at least one of: a time domain resource occupied by a forward time-frequency resource for sidelink communication in a target time unit, or a time domain resource occupied by a reverse time-frequency resource for sidelink communication in the target time unit. The forward time-frequency resource transmits user data and control information, and the reverse time-frequency resource transmits feedback information from a device for receiving the user data to a device for transmitting the user data.

At least one of the time domain resource occupied by the forward time-frequency resource or the time domain resource occupied by the reverse time-frequency resource is determined according to the resource allocation indication information.

In an embodiment, the resource allocation indication information may include at least one of: first resource indication information or second resource indication information.

The first resource indication information indicates a length of the time domain resource occupied by the forward time-frequency resource for sidelink communication in the target time unit, and the second resource indication information indicates a length of the time domain resource occupied by the reverse time-frequency resource.

In an embodiment, the resource allocation indication information may include at least one of: third resource indication information or fourth resource indication information.

The third resource indication information indicates a starting position and a length of the time domain resource occupied by the forward time-frequency resource for sidelink communication in the target time unit, and the fourth resource indication information indicates a starting position and a length of the time domain resource occupied by the reverse time-frequency resource.

In an embodiment, the resource allocation indication information may include an identifier of a time domain resource allocation format indicating the UE to determine, according to the time domain resource allocation format, at least one of: the time domain resource occupied by the forward time-frequency resource or the time domain resource occupied by the reverse time-frequency resource.

In an embodiment, the operation of receiving the resource allocation indication information from the base station may include the following actions.

An RRC signaling is received from the base station, the RRC signaling includes the resource allocation indication information. Or, DCI is received from the base station, the DCI includes the resource allocation indication information.

In an embodiment, the method may further include the following operations.

A time domain resource between the forward time-frequency resource and the reverse time-frequency resource is determined as a guard interval. The time domain resource occupied by the guard interval provides the UE with a time for switching between transmission directions.

In an embodiment, the feedback information may include any one of: HARQ feedback information or CSI feedback information, or a combination thereof.

Figure 14:
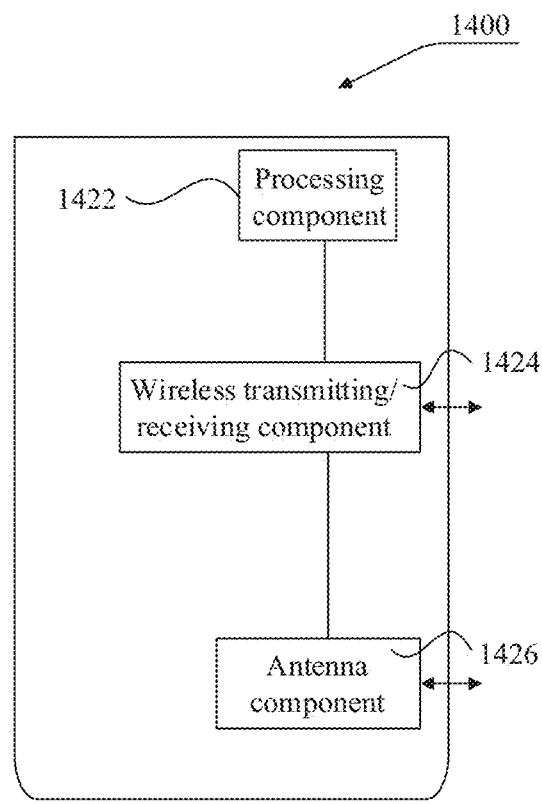
FIG. 14 is a block diagram illustrating an apparatus for resource allocation according to an exemplary embodiment.

FIG. 14 is a block diagram illustrating an apparatus for resource allocation according to an exemplary embodiment. As illustrated in FIG. 14, the apparatus 1400 for resource allocation may be provided as a base station in a cellular network. As illustrated in FIG. 14, the apparatus 1400 for resource allocation includes a processing component 1422, a wireless transmitting/receiving component 1424, an antenna component 1426 and a signal processing portion specific to the wireless interface. The processing component 1422 may further include one or more processors.

One of the processors in the processing component 1422 may be configured to perform the following method. The method includes the following operations.

Time-frequency resources for sidelink communication in a target time unit are divided into a forward time-frequency resource and a reverse time-frequency resource for time division multiplexing. The forward time-frequency resource transmits user data and control information, and the reverse time-frequency resource transmits feedback information from a device for receiving the user data to a device for transmitting the user data.

Resource allocation indication information is transmitted to a UE. The resource allocation indication information indicates at least one of: a time domain resource occupied by the forward time-frequency resource for sidelink communication in the target time unit, or a time domain resource occupied by the reverse time-frequency resource for sidelink communication in the target time unit.

In an embodiment, the resource allocation indication information may include at least one of: first resource indication information or second resource indication information.

The first resource indication information indicates a length of the time domain resource occupied by the forward time-frequency resource for sidelink communication in the target time unit, and the second resource indication information indicates a length of the time domain resource occupied by the reverse time-frequency resource.

In an embodiment, the resource allocation indication information may include at least one of: third resource indication information or fourth resource indication information.

The third resource indication information indicates a starting position and a length of the time domain resource occupied by the forward time-frequency resource for sidelink communication in the target time unit, and the fourth resource indication information indicates a starting position and a length of the time domain resource occupied by the reverse time-frequency resource.

In an embodiment, the resource allocation indication information may include an identifier of a time domain resource allocation format indicating the UE to determine, according to the time domain resource allocation format, at least one of: the time domain resource occupied by the forward time-frequency resource or the time domain resource occupied by the reverse time-frequency resource.

In an embodiment, the operation of transmitting the resource allocation indication information to the UE may include the following actions.

A RRC signaling is transmitted to the UE. The RRC signaling includes the resource allocation indication information.

Or, DCI is transmitted to the UE. The DCI includes the resource allocation indication information.

In an embodiment, the method may further include the following operations.

A time domain resource between the forward time-frequency resource and the reverse time-frequency resource is determined as a guard interval. The time domain resource occupied by the guard interval provides the UE with a time for switching between transmission directions.

In an embodiment, the feedback information may include any one of: HARQ feedback information or CSI feedback information, or a combination thereof.

Other embodiments of the disclosure will be apparent to those skilled in the art from consideration of the specification and practice of the disclosure here. The disclosure is intended to cover any variations, uses or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for resource allocation, applied to user equipment (UE), comprising:
   receiving resource allocation indication information from a base station, wherein the resource allocation indication information indicates a time domain resource occupied by a forward time-frequency resource for sidelink communication in a slot and a time domain resource occupied by a reverse time-frequency resource for sidelink communication in the slot, the forward time-frequency resource transmits at least one of a physical sidelink share channel (PSSCH) or a physical sidelink control channel (PSCCH), and the reverse time-frequency resource transmits a physical sidelink feedback channel (PSFCH) from a device for receiving the user data to a device for transmitting the user data; and
   determining, according to the resource allocation indication information, the time domain resource occupied by the forward time-frequency resource in the slot and the time domain resource occupied by the reverse time-frequency resource in the slot, wherein sequence number of a time domain symbol occupied by the forward time-frequency resource is smaller than sequence number of a time domain symbol occupied by the reverse time-frequency resource, the forward time-frequency resource occupies the time domain symbol at a front position in the slot, and the reverse time-frequency resource occupies the time domain symbol at a latter position in the slot.

2. The method of claim 1, wherein the resource allocation indication information comprises at least one of: first resource indication information or second resource indication information; and
   wherein the first resource indication information indicates a length of the time domain resource occupied by the forward time-frequency resource, and the second resource indication information indicates a length of the time domain resource occupied by the reverse time-frequency resource.

3. The method of claim 1, wherein the resource allocation indication information comprises at least one of: third resource indication information or fourth resource indication information; and
   wherein the third resource indication information indicates a starting position and a length of the time domain resource occupied by the forward time-frequency resource, and the fourth resource indication information indicates a starting position and a length of the time domain resource occupied by the reverse time-frequency resource.

4. The method of claim 1, wherein the resource allocation indication information comprises an identifier of a time domain resource allocation format indicating the UE to determine, according to the time domain resource allocation format, the time domain resource occupied by the forward time-frequency resources and the time domain resource occupied by the reverse time-frequency resource.

5. The method of claim 1, wherein said receiving the resource allocation indication information from the base station comprises:
   receiving a radio resource control (RRC) signaling from the base station, wherein the RRC signaling comprises the resource allocation indication information; or
   receiving downlink control information (DCI) from the base station, wherein the DCI comprises the resource allocation indication information.

6. The method of claim 1, further comprising:
   determining a time domain resource between the forward time-frequency resource and the reverse time-frequency resource as a guard interval, wherein the time domain resource occupied by the guard interval provides the UE with a time for switching between transmission directions.

7. The method of claim 1, wherein the feedback information comprises any one of: hybrid automatic repeat request (HARQ) feedback information or channel state information (CSI) feedback information, or a combination thereof, and wherein a last time domain symbol of the slot is not used to transmit the PSSCH.

8. A method for resource allocation, applied to a base station, comprising:
   transmitting resource allocation indication information to a user equipment (UE), wherein the resource allocation indication information indicates a time domain resource occupied by a forward time-frequency resource for sidelink communication in a slot and a time domain resource occupied by a reverse time-frequency resource for sidelink communication in the slot, so that the UE determines the time domain resource occupied by the forward time-frequency resource in the slot and the reverse time-frequency resource in the slot according to the resource allocation indication information,
   wherein the forward time-frequency resource transmits at least one of a physical sidelink share channel (PSSCH) or a physical sidelink control channel (PSCCH), and the reverse time-frequency resource transmits a physical sidelink feedback channel (PSFCH) from a device for receiving the user data to a device for transmitting the user data,
   wherein sequence number of a time domain symbol occupied by the forward time-frequency resource is smaller than sequence number of a time domain symbol occupied by the reverse time-frequency resource, the forward time-frequency resource occupies the time domain symbol at a front position in the slot, and the reverse time-frequency resource occupies the time domain symbol at a latter position in the slot.

9. The method of claim 8, wherein the resource allocation indication information comprises at least one of: first resource indication information or second resource indication information; and wherein the first resource indication information indicates a length of the time domain resource occupied by the forward time-frequency resource, and the second resource indication information indicates a length of the time domain resource occupied by the reverse time-frequency resource.

10. The method of claim 8, wherein the resource allocation indication information comprises at least one of: third resource indication information or fourth resource indication information; and wherein the third resource indication information indicates a starting position and a length of the time domain resource occupied by the forward time-frequency resource, and the fourth resource indication information indicates a starting position and a length of the time domain resource occupied by the reverse time-frequency resource.

11. The method of claim 8, wherein the resource allocation indication information comprises an identifier of a time domain resource allocation format indicating the UE to determine, according to the time domain resource allocation format, the time domain resource occupied by the forward time-frequency resources and the time domain resource occupied by the reverse time-frequency resource.

12. The method of claim 8, wherein said transmitting the resource allocation indication information to the UE comprises:

transmitting a radio resource control (RRC) signaling to the UE, wherein the RRC signaling comprises the resource allocation indication information; or transmitting downlink control information (DCI) to the UE, wherein the DCI comprises the resource allocation indication information.

13. The method of claim 8, further comprising:

determining a time domain resource between the forward time-frequency resource and the reverse time-frequency resource as a guard interval, wherein the time domain resource occupied by the guard interval provides the UE with a time for switching between transmission directions.

14. The method of claim 8, wherein the feedback information comprises any one of: hybrid automatic repeat request (HARQ) feedback information or channel state information (CSI) feedback information, or a combination thereof, and wherein a last time domain symbol of the slot is not used to transmit the PSSCH.

15. An apparatus for resource allocation, comprising:

a processor;

memory for storing instructions executable by the processor; and a communication component;

wherein the processor is configured to execute the instructions to:

control the communication component to receive resource allocation indication information from a base station, wherein the resource allocation indication information indicates a time domain resource occupied by a forward time-frequency resource for sidelink communication in a slot and a time domain resource occupied by a reverse time-frequency resource for sidelink communication in the slot, the forward time-frequency resource transmits at least one of a physical sidelink share channel (PSSCH) or a physical sidelink control channel (PSCCH), and the reverse time-frequency resource transmits a physical sidelink feedback channel (PSFCH) from a device for receiving the user data to a device for transmitting the user data; and determine, according to the resource allocation indication information, the time domain resource occupied by the forward time-frequency resource in the slot and the time domain resource occupied by the reverse time-frequency resource in the slot, wherein sequence number of a time domain symbol occupied by the forward time-frequency resource is smaller than sequence number of a time domain symbol occupied by the reverse time-frequency resource, the forward time-frequency resource occupies the time domain symbol at a front position in the slot, and the reverse time-frequency resource occupies the time domain symbol at a latter position in the slot.

16. The apparatus of claim 15, wherein the resource allocation indication information comprises at least one of: first resource indication information or second resource indication information; and wherein the first resource indication information indicates a length of the time domain resource occupied by the forward time-frequency resource, and the second resource indication information indicates a length of the time domain resource occupied by the reverse time-frequency resource.

17. The apparatus of claim 15, wherein the resource allocation indication information comprises at least one of: third resource indication information or fourth resource indication information; and wherein the third resource indication information indicates a starting position and a length of the time domain resource occupied by the forward time-frequency resource, and the fourth resource indication information indicates a starting position and a length of the time domain resource occupied by the reverse time-frequency resource.

18. The apparatus of claim 15, wherein the resource allocation indication information comprises an identifier of a time domain resource allocation format indicating the UE to determine, according to the time domain resource allocation format, the time domain resource occupied by the forward time-frequency resource and the time domain resource occupied by the reverse time-frequency resource.

19. The apparatus of claim 15, wherein the processor is further configured to:

receive a radio resource control (RRC) signaling from the base station, wherein the RRC signaling comprises the resource allocation indication information; or receive downlink control information (DCI) from the base station, wherein the DCI comprises the resource allocation indication information.

20. The apparatus of claim 15, wherein the processor is further configured to:

determine a time domain resource between the forward time-frequency resource and the reverse time-frequency resource as a guard interval, wherein the time domain resource occupied by the guard interval provides the UE with a time for switching between transmission directions.

* * * * *